Nov. 12, 1968   W. R. PENNEY   3,410,533
MIXING EQUIPMENT
Filed May 31, 1966

INVENTOR
W.R. PENNEY

BY  Young and Quigg

ATTORNEYS

United States Patent Office 3,410,533
Patented Nov. 12, 1968

3,410,533
MIXING EQUIPMENT
William R. Penney, Stillwater, Okla., assignor to Phillips
Petroleum Company, a corporation of Delaware
Filed May 31, 1966, Ser. No. 553,812
6 Claims. (Cl. 259—9)

ABSTRACT OF THE DISCLOSURE

An improved agitator for a heat exchange vessel includes a rotating pair of cylindrical agitators provided with means for maintaining them in rolling contact with the inner wall of the vessel.

---

This invention relates to improved processing equipment. In one aspect this invention relates to a novel heat exchanger which is capable of improving the heat transfer through viscous fluid reacting media or viscous reaction products contained therein. In another aspect, this invention relates to an agitating means capable of improving the mixing and heat transfer characteristics of a viscous solution.

The use of various types of mixing and agitating equipment is well established. While equipment of the conventional type such as embodying propeller agitators in cylindrical vessels or blade type stirrers in autoclaves is quite satisfactory for the agitation of or reacting together of liquid phases; however, serious difficulties have been experienced when attempting to employ this conventional equipment in promoting reactions of liquids which upon reacting form a viscous or plastic-solid phase. The difficulties encountered in such highly viscous solution systems are related to the need to maintain high concentrations of polymers which often cause the solution to exhibit nonuniformity of temperature and composition in the reactor, low heat transfer coefficients in the exchangers and the deposition of catalyst, polymer and/or gel in both areas. In addition, if crystalline structure is present, it may control the product consistency and its character is determined to a considerable extent by a certain pattern of heat transfer in either the reactor or the heat exchanger whereupon this pattern is a factor which must be reproduced in subsequent operation for product duplication. Otherwise the process would suffer in terms of the molecular weight distribution of the product, product degradation due to uncertain temperature levels, and equipment maintenance and lost product due to frequent cleaning of reactors and exchangers.

The apparatus of the subject invention is particularly adaptable to polymerization reactions wherein a high concentration of polymer in the reaction medium is desired for processing economy reasons. The heating and cooling of foods, petroleum waxes, plasticizing of margarine, etc. wherein the operations are generally carried out in equipment which is of very minimal size, is another field of application for this invention.

Certain investigators have discovered that the use of turbulent flow minimizes the difficulties in the reactions enumerated hereinabove. For example, reaction vessels have been employed in which the reaction occurs in steel tubes of small diameter while turbulent flow is being maintained. However, it would be appreciated that the amount of power necessary to create turbulent flow in the case of viscous fluids would be enormous and hence this form of equipment is uneconomical and impractical in many ways.

Therefore it is an object of the present invention to provide an agitator which is simple and easy to construct, provides mixing of a viscous solution, provides maximum heat transfer, and exhibits a minimum of wear.

Another object of this invention is to provide a heat exchanger wherein a uniform rate of overall flow may be maintained while still subjecting the reactants to varying rates of flow while in said apparatus.

It is a further object of this invention to provide apparatus capable of maintaining accurate temperature control of reactions being carried out therein and self-cleaning as well.

Other objects and many of the attendant advantages of this invention will be readily appreciated as the same becomes better understood by reference to the following detailed description which is to be considered in connection with the accompanying drawings wherein.

Briefly the invention consists of an externally jacketed vessel in which is rotated a pair of cylindrical agitators provided with means for maintaining them in rolling contact with the internal wall of said vessel. Preferably the agitators can be a pair of tubular members or solid cylinders.

Figure 1:
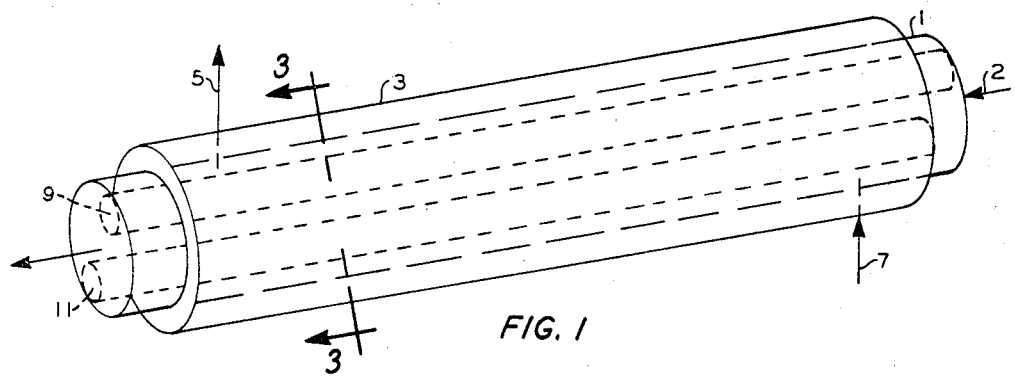
FIGURE 1 shows in perspective a simple form of the apparatus comprising a housing and the improved agitating means.

In order that the invention may be readily understood, reference is made to the drawing attached to the specification. With particular reference to FIGURE 1 therein, there is shown a heat exchanger, which may be a reactor, consisting of a cylindrical chamber 1, surrounded by an appropriate jacket 3 and equipped with inlet pipe 7 and outlet pipe 5. Mounted within this cylindrical chamber 1 are two cylindrical agitators 9 and 11 (shown in greater detail in FIGURES 2 and 3) of smaller diameter. To permit mounting of the agitators 9 and 11 so that they not only contact the inner wall of 1 but also so that they will be able to roll upon the inner wall of 1, a drive shaft 13 suitably connected to a driving means (not shown) is passed through one end of chamber 1. The drive shaft 13 is positioned so that it may turn freely about the longitudinal center line of 1. A conventional packing gland 4 can be employed to prevent leakage. A drive arm 15 is provided with bearing means at both ends (i.e., roller bearings) in contact with agitator shafts 18 and 20. The shafts 18 and 20 are connected to the agitators 9 and 11. By rotation of drive arm 15 the agitators 9 and 11 are caused to pass over the inner wall of cylinder 1 and while so passing may be rotated to provide a rolling motion over the inner wall of 1.

In order to effect a rolling contact between the agitators 9 and 11 with the inside wall of 1, various means are employed to cause a pressing of them against the said inside surface.

Figure 3:
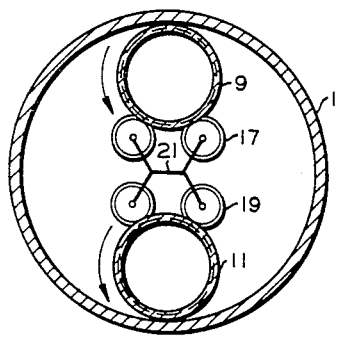
FIGURE 3 is a cross-section of the apparatus of FIGURE 1 taken along the lines 3—3 of FIGURE 1.
Figure 2:
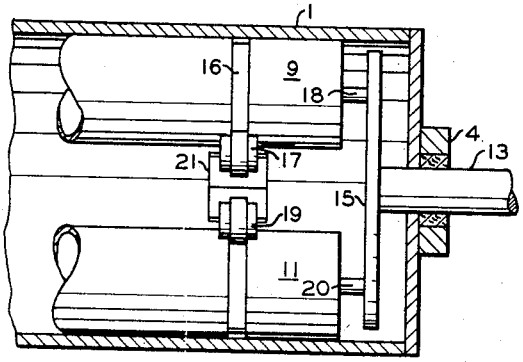
FIGURE 2 is a partial cross-section along one end of FIGURE 1.

FIGURES 2 and 3 depict one such means. In this embodiment the cylindrical agitators 9 and 11 are provided with one or more circumferential grooves 16 located along the longitudinal length thereof. A pair of rollers 17 and 19 are adapted to fit into grooves 16. The rollers are held in compression by a spring means such as leaf spring means 21 or the like. Consequently when shaft 13 is rotated the agitators 9 and and 11 are pressed against the inner wall of 1. The assembly, comprising guide rollers 17 and 19 and spring means 21, permits the agitators 9 and 11 to rotate freely due to the viscous action of the reaction fluid between the said cylindrical agitators and the inner wall of 1. The rotation of the agitators 9 and 11 about shafts 18 and 20 results from the friction between them and the inner wall of the exchanger 1.

Figure 4:
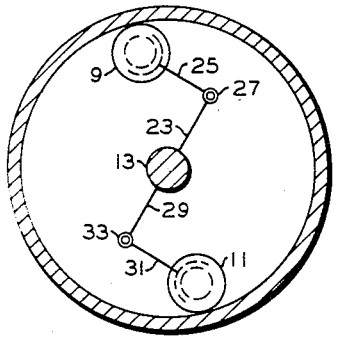
FIGURES 4, 5 and 6 show modified forms of the apparatus of FIGURE 1.
Figure 5:
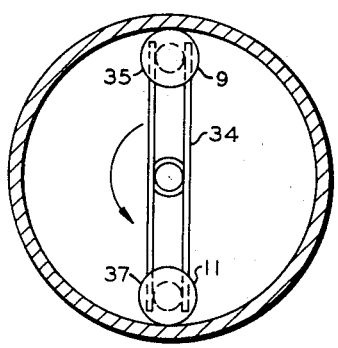
Figure 6:
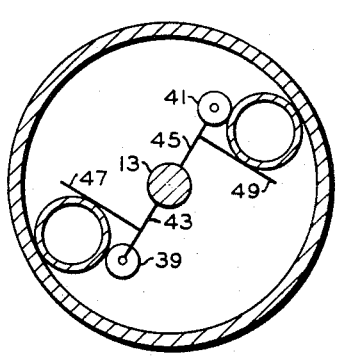

FIGURES 4, 5 and 6 show other means for effecting the contacting of cylindrical agitators 9 and 11 with the inner wall of the exchanger 1.

In FIGURE 4, it will be noted that agitator 9 is rotably attached to one end of arm 25. The other end of arm 25 is rigidly connected with one end of arm 23 to form joint 27. The other end of arm 23 is attached to shaft 13 by welding or the like. Agitator 11 is likewise rotatably attached to one end of arm 31. The other end of arm 31 is rigidly connected at joint 33 to one end of arm 29. The other end of arm 29 is suitably connected to shaft 13. In this embodiment, the agitators 9 and 11 are forced against the inside wall of cylinder 1 due to the compression exerted upon them by arms 25, 31, 23, and 29.

In FIGURE 5, a yoke 34 is positioned over the drive shaft 13. Bushings 35 and 37 rotatably attach the yoke to the cylindrical agitators 9 and 11, respectively. In this embodiment, the agitators 9 and 11 are forced into contact with the inner wall of exchanger 1 due to the centrifugal force created by their rotation.

In FIGURE 6, two driving rollers 39 and 41 are rotatably attached through arms 43 and 45 to shaft 13. The rotating action of shaft 13 causes the driving rollers to press the cylindrical agitators 9 and 11 into contact with the inner wall of cylinder 1. Arms 47 and 49 are welded to arms 43 and 45, respectively, in order to maintain the agitators 9 and 11 in proper position when the shaft 13 is not rotating.

In order to demonstrate the effectiveness of my agitating means, the following example is provided which compares the rolling surface apparatus which is described hereinabove with a conventional paddle agitator.

said agitators is provided with one or more circumferential grooves positioned therealong, and said compression means comprises rolling means adapted to being fitted into said grooves along each of said agitators and spring means positioned between and connected to adjacent rolling means whereby said cylindrical agitators are pressed into rolling contact with the inner wall of said vessel.

3. An agitator according to claim 1 further characterized in that said compression means comprises a first arm rotatably connected at one end to one of said pair of cylindrical agitators, and angularly connected at the opposite end to one end of a second arm thereby forming a first rigid joint, the opposite end of said second arm immovably attached to said shaft; a third arm rotatably connected at one end to the other of said pair of cylindrical agitators, and angularly connected at the opposite end to one end of a fourth arm thereby forming a second rigid joint, the opposite end of said fourth arm immovably attached to said shaft whereby the angular configuration of the arms provides compression of said agitators against said inner wall during rolling contact therewith.

4. An agitator according to claim 1 further characterized in that said compression means comprises a yoke means which is rigidly connected to said rotatable shaft; bushing means positioned at each end of said yoke means for connecting each of said agitators with said yoke means.

5. An agitator according to claim 1 further characterized in that said compression means comprises a first driving roller, a first drive arm connecting said driving roller with said shaft, whereby said first roller is held in contact with the first of said pair of agitators, a first arm means attached to said first drive arm for supporting said first

|  | Temp. of Oil Into Exchanger T° F. | Temp. of Oil Out Exchanger T° F. | Oil Flow Rate Through Exchanger ((lb./hr.) W [a] | Electrical Heat Flux (Q/A) [b] (B.t.u./hr. ft.²) | Rotating Speed of Agitator (rev./min.) | Heat Transfer Coefficient (B.t.u./hr. ft.² ° F.) | Bulk Viscosity [c] (centipoise) |
|---|---|---|---|---|---|---|---|
| Cylindrical Agitator | 112.23 | 115.73 | 1,312 | 1,117 | 19.8 | 65.0 | 287 |
| Do | 112.33 | 115.79 | 1,324 | 1,113 | 54.4 | 63.1 | 296 |
| Do | 113.32 | 116.80 | 1,321 | 1,117 | 94.0 | 69.1 | 285 |
| Do | 113.32 | 116.89 | 1,292 | 1,118 | 128.5 | 73.4 | 284 |
| Do | 112.98 | 116.51 | 1,308 | 1,120 | 202.7 | 73.5 | 284 |
| Paddle Agitator | 116.15 | 120.28 | 1,387 | 1,396 | 24.7 | 20.8 | 245 |
| Do | 116.67 | 120.70 | 1,421 | 1,396 | 69.1 | 23.5 | 242 |
| Do | 115.81 | 119.85 | 1,427 | 1,403 | 103.8 | 24.1 | 257 |
| Do | 115.61 | 119.62 | 1,423 | 1,391 | 148.1 | 25.43 | 250 |
| Do | 115.98 | 120.03 | 1,414 | 1,396 | 143.3 | 26.34 | 249 |
| Do | 116.22 | 120.27 | 1,420 | 1,403 | 221.0 | 29.23 | 243 |

[a] Mass flow rate through the agitator in pounds per hour. [b] Total heat transfer per unit time/area. [c] A Gulf Harmony Oil 151 was used as the fluid.

Both the cylindrical agitators and the flat paddle agitators were tested in an electrically-heated, aluminum heat exchanger which had a ¼ aluminum wall and the dimensions were 4.057 inches in diameter by 22 inches in length. The paddle was 4.00 inches wide by 21 inches long by 1/16 inch thick. The curved surfaces were 1¼ inch diameter by 21 inch long cylinders.

What is claimed is:

1. An improved agitator for use in a heat exchanger vessel, said agitator comprising in combination a rotatable shaft; a pair of cylindrical agitators; means for rotatably attaching said agitators to said shaft wherein said agitators are on opposite sides of said shaft and compression means interconnecting and pressing each of said agitators against the inner wall of said heat vessel whereby each of said cylindrical agitators is maintained in rolling contact with said inner wall.

2. An agitator according to claim 1 wherein said means for rotatably attaching said agitators to said shaft comprises an arm; agitator shaft means attached to each end of said arm for rotatably connecting each of said agitators to said arm and further characterized in that each of agitator against said inner wall, a second driving roller; a second drive arm connecting said second roller with said shaft, whereby said second roller is held in contact with the second of said pair of agitators, and a second arm means connected with said second drive arm for supporting said second agitator against said inner wall.

6. An agitator according to claim 1 further in combination with an outer cylinder having closed ends and being positioned around said agitator; means to flow fluid reactant longitudinally through said cylinder wherein said improved agitator is positioned inside of said cylinder and the inner wall of said cylinder is continuously cleaned of said fluid reactant.

References Cited

UNITED STATES PATENTS 2,838,780   6/1958   Kean _____ 165—94 XR

WALTER A. SCHEEL, *Primary Examiner.*

J. M. BELL, *Assistant Examiner.*